US006851275B2

(12) United States Patent
Kreutzmann et al.

(10) Patent No.: US 6,851,275 B2
(45) Date of Patent: Feb. 8, 2005

(54) IN-CAR HYDRATION SYSTEMS

(75) Inventors: Kurt Kreutzmann, Cary, IL (US); Don Prestley, Crystal Lake, IL (US); Dennis Broeske, Wonder Lake, IL (US); Steve Ehardt, Algonquin, IL (US); John R. Califf, Carpentersville, IL (US); John Konieczka, Lake Barrington, IL (US); Jeff Zachwieja, Cary, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 0 days.

(21) Appl. No.: 10/641,722

(22) Filed: Aug. 15, 2003

(65) Prior Publication Data

US 2004/0103684 A1 Jun. 3, 2004

Related U.S. Application Data

(63) Continuation-in-part of application No. 10/361,068, filed on Feb. 7, 2003, now Pat. No. 6,755,047, which is a continuation-in-part of application No. 10/268,435, filed on Oct. 10, 2002, now Pat. No. 6,745,594.

(51) Int. Cl.[7] .................................................. F25D 3/08
(52) U.S. Cl. ........................ 62/457.3; 62/457.2; 62/530
(58) Field of Search ............................ 62/457.1, 457.2, 62/457.3, 371, 389, 530

(56) References Cited

U.S. PATENT DOCUMENTS

| 581,767 | A | 5/1897 | Powers | |
|---|---|---|---|---|
| 2,969,064 | A | 1/1961 | Metz | 128/222 |
| 3,179,085 | A | 4/1965 | McKillip, Jr. | 119/75 |
| 3,289,635 | A | 12/1966 | Eagles | 119/72.5 |
| 3,642,023 | A | 2/1972 | Rembert | 137/209 |
| 3,646,955 | A | 3/1972 | Olde | 137/382 |
| 3,698,431 | A | 10/1972 | Thompson | 137/604 |
| 3,698,685 | A | 10/1972 | Lang | 251/303 |
| 3,734,063 | A | 5/1973 | Atchley | 119/72.5 |
| 4,090,650 | A | 5/1978 | Gotta | 224/5 |
| 4,274,566 | A | 6/1981 | Rowe | 224/35 |
| 4,370,948 | A | 2/1983 | Atkins | 119/72.5 |
| 4,403,570 | A | 9/1983 | Freehafer | 119/72.5 |

(List continued on next page.)

FOREIGN PATENT DOCUMENTS

| DE | 43 08 763 | 9/1994 |
|---|---|---|
| EP | 0 559 924 | 9/1993 |
| FR | 2595678 | 9/1987 |
| FR | 2 737 448 | 2/1997 |
| WO | WO 01/39620 | 6/2001 |

OTHER PUBLICATIONS

International search report for application No. PCT/US03/31883, mailed May 15, 2004.

*Primary Examiner*—Melvin Jones
(74) *Attorney, Agent, or Firm*—Cook, Alex, McFarron, Manzo, Cummings & Mehler, Ltd.

(57) ABSTRACT

Systems and methods for a liquid delivery system for a race vehicle to provide the driver of the race vehicle with readily available cool fluids are disclosed. One embodiment is directed to an insulated bag mounted in the race vehicle having a collapsible fluid bladder and a cooling medium within the bag. Tubing connects the bladder to a valve for the driver to drink from. Preferably, a pump is coupled to the tubing to move fluid through the system.

17 Claims, 4 Drawing Sheets

U.S. PATENT DOCUMENTS

| | | | |
|---|---|---|---|
| 4,526,298 A | 7/1985 | Boxer et al. | 222/130 |
| 4,566,507 A | 1/1986 | Rauchwerger | 141/271 |
| 4,573,433 A | 3/1986 | Thompson | 119/72.5 |
| 4,629,098 A | 12/1986 | Eger | 222/175 |
| 4,681,244 A * | 7/1987 | Geddie | 222/144.5 |
| 4,739,905 A | 4/1988 | Nelson | 222/145 |
| 4,813,083 A | 3/1989 | Davidson | 2/422 |
| 4,815,635 A | 3/1989 | Porter | 222/136 |
| 4,852,781 A | 8/1989 | Shurnick et al. | 224/148 |
| 4,911,339 A | 3/1990 | Cushing | 222/610 |
| 4,921,141 A | 5/1990 | Branum | 222/146.6 |
| 4,948,023 A | 8/1990 | Tripp | 224/148 |
| 4,961,324 A | 10/1990 | Allan | 62/400 |
| 4,974,903 A | 12/1990 | Lipschitz et al. | 297/188 |
| 5,003,927 A | 4/1991 | Thompson | 119/72.5 |
| 5,060,833 A | 10/1991 | Edison et al. | 224/148 |
| 5,062,591 A | 11/1991 | Runkel | 224/148 |
| 5,085,349 A | 2/1992 | Fawcett | 222/175 |
| 5,104,016 A | 4/1992 | Runkel | 224/148 |
| 5,143,390 A | 9/1992 | Goldsmith | 280/201 |
| 5,148,950 A | 9/1992 | Hosaka | 222/175 |
| 5,158,218 A | 10/1992 | Wery | 222/610 |
| 5,201,442 A | 4/1993 | Bakalian | 222/610 |
| 5,215,231 A | 6/1993 | Paczonay | 222/610 |
| 5,265,769 A | 11/1993 | Wilson | 222/175 |
| 5,282,557 A | 2/1994 | McCook | 224/211 |
| 5,326,124 A | 7/1994 | Allemang | 280/288 |
| 5,358,142 A | 10/1994 | Holmes | 222/1 |
| 5,370,278 A * | 12/1994 | Raynie | 222/175 |
| 5,431,308 A | 7/1995 | Tchen | 222/175 |
| 5,484,405 A | 1/1996 | Edstrom, Sr. | 604/77 |
| 5,566,869 A | 10/1996 | Katz | 224/148.6 |
| 5,571,260 A | 11/1996 | Krug | 222/175 |
| 5,601,207 A | 2/1997 | Paczonay | 220/703 |
| 5,601,221 A | 2/1997 | Karr | 224/148.2 |
| 5,607,087 A | 3/1997 | Wery et al. | 222/610 |
| 5,645,404 A | 7/1997 | Zelenak | 417/1 |
| 5,699,933 A | 12/1997 | Ho et al. | 220/703 |
| 5,711,164 A | 1/1998 | Slack | 62/457.9 |
| 5,722,573 A | 3/1998 | Carnel | 224/148.2 |
| 5,727,714 A | 3/1998 | Fawcett | 222/175 |
| 5,730,336 A | 3/1998 | Lerner | 222/490 |
| 5,740,940 A | 4/1998 | Weiss | 220/412 |
| 5,755,368 A | 5/1998 | Bekkedahl | 224/414 |
| 5,791,510 A | 8/1998 | Paczonay | 220/714 |
| 5,806,726 A | 9/1998 | Ho | 222/529 |
| 5,894,955 A | 4/1999 | Garrigues | 222/61 |
| 5,911,406 A | 6/1999 | Winefordner et al. | 251/339 |
| 5,913,456 A | 6/1999 | Dikeman | 222/95 |
| 5,924,678 A | 7/1999 | Olde | 251/348 |
| 5,970,523 A | 10/1999 | Atkins | 2/209.1 |
| 5,984,145 A | 11/1999 | McAllister | 222/175 |
| 6,032,831 A | 3/2000 | Gardner et al. | 222/175 |
| 6,050,444 A | 4/2000 | Sugg | 220/707 |
| 6,062,435 A | 5/2000 | Hess, III | 222/175 |
| 6,070,767 A | 6/2000 | Gardner et al. | 222/175 |
| 6,145,695 A | 11/2000 | Garrigues | 220/705 |
| 6,199,729 B1 | 3/2001 | Drzymkowski | 224/148.2 |
| 6,220,490 B1 | 4/2001 | O'Hara | 224/148.2 |
| 6,241,575 B1 | 6/2001 | Shailer | 450/38 |
| 6,247,619 B1 | 6/2001 | Gill et al. | 222/105 |
| 6,264,166 B1 | 7/2001 | Bowland et al. | 251/144 |
| 6,283,344 B1 | 9/2001 | Bradley | 224/148.2 |
| 6,364,168 B1 | 4/2002 | Gardner et al. | 222/175 |
| 2002/0113101 A1 | 8/2002 | Skillern | 224/148.2 |

* cited by examiner

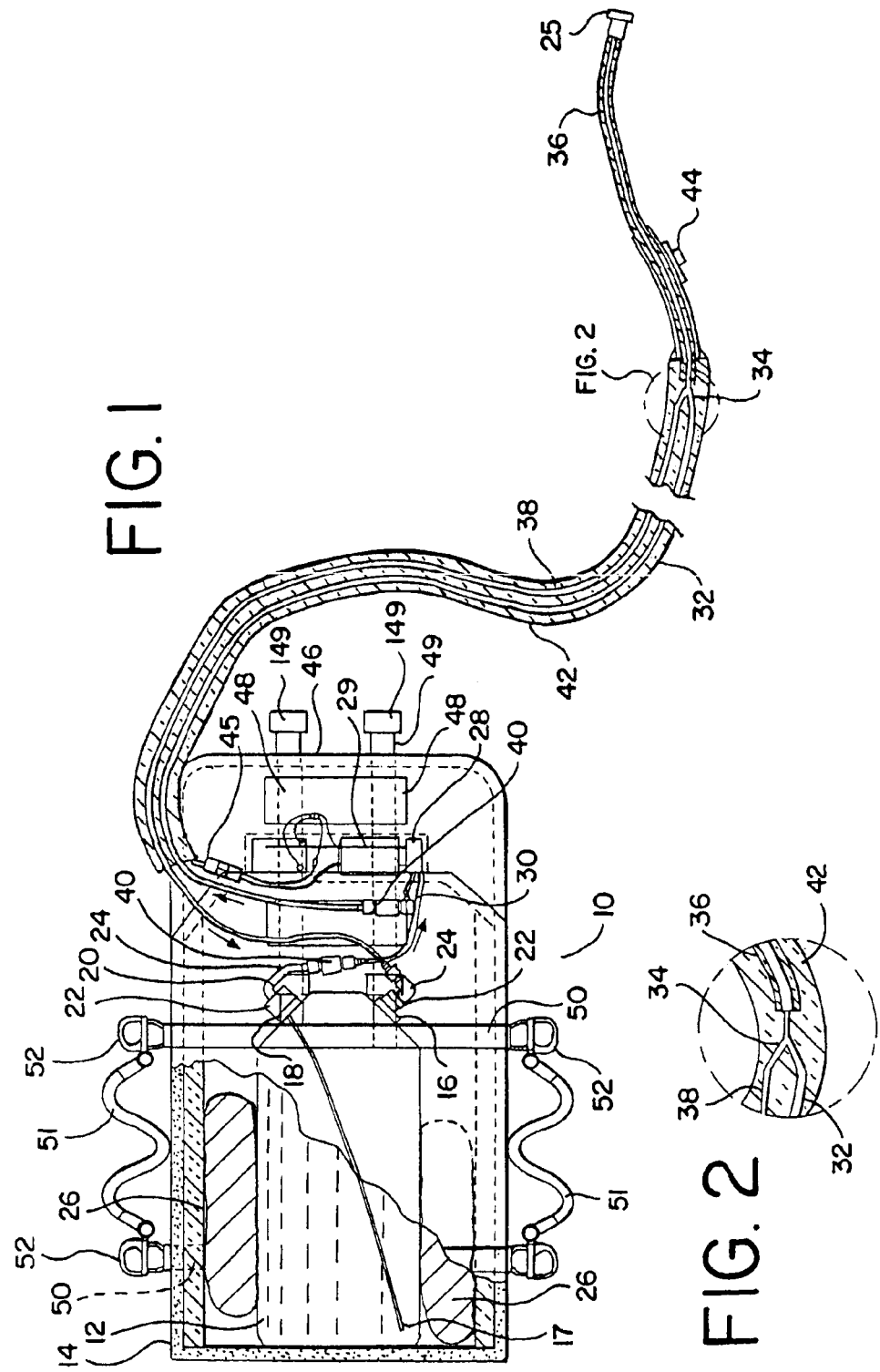

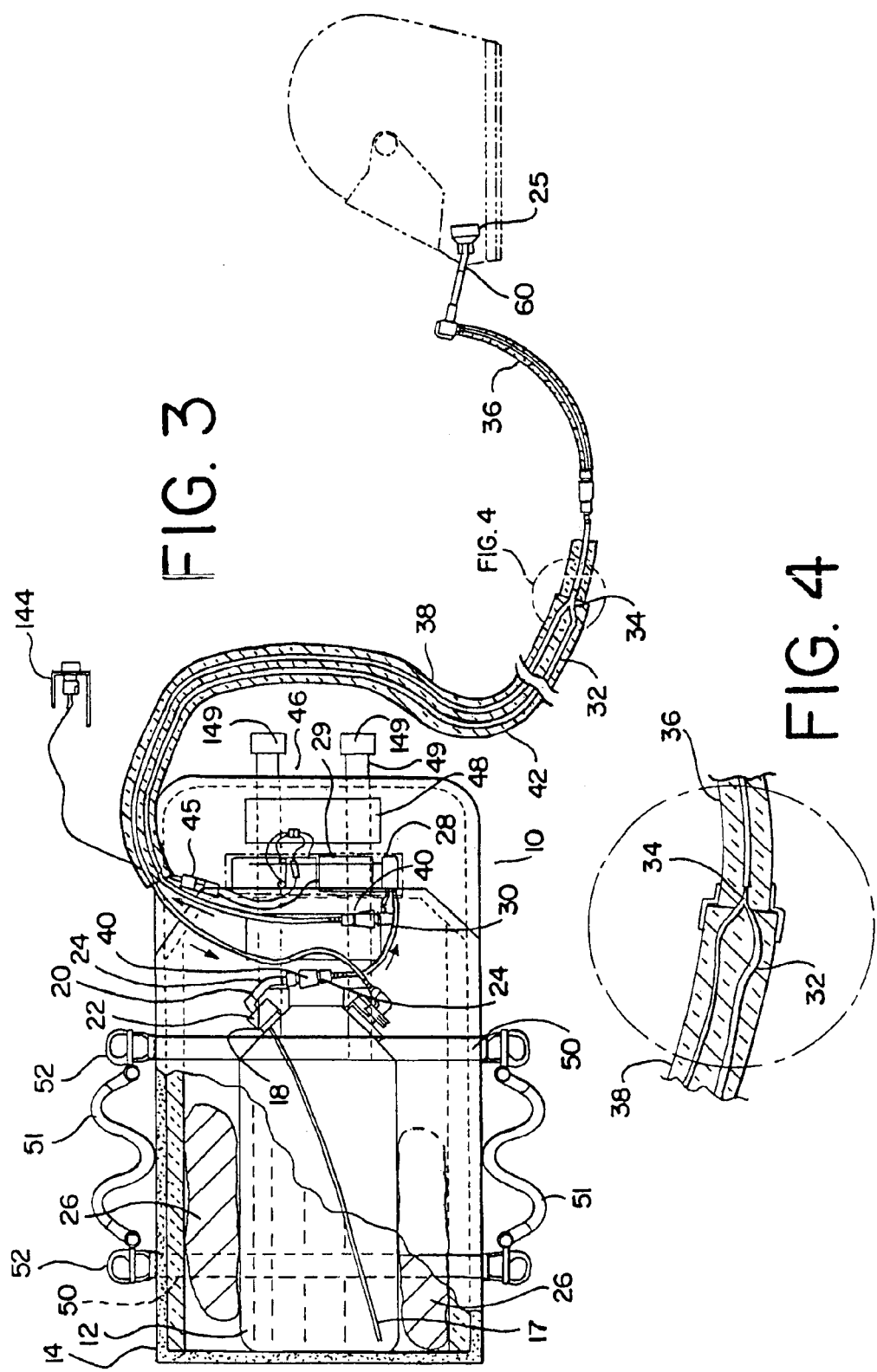

IN-CAR HYDRATION SYSTEMS

FIELD OF THE INVENTION

This application is a continuation-in-part of U.S. Ser. No. 10/361,068 filed Feb. 7, 2003 now U.S. Pat. No. 6,755,047, which is continuation-in-part of U.S. Ser. No. 10/268,435 Oct. 10, 2002 now U.S. Pat. No. 6,745,594.

The present invention is directed to an in-car hydration system. In particular, the present invention is directed to systems for storing a beverage, such as an isotonic sports drink, in a vehicle, keeping it cool, and permitting easy and quick access to the drink by the driver of the vehicle. More specifically, the system is for use in a race car or truck for use by the driver during the race.

BACKGROUND OF THE INVENTION

Hydration of a race car driver is extremely important. During a race, a race car driver wears a protective suit and helmet. There is no air conditioning in a race car. Further, many races are run in summer and/or in the Southern U.S.A. As a result, the race car driver experiences a large amount of fluid loss during the race. In order for the driver to be able to compete successfully in the race, he or she will need to replenish the fluids lost or suffer a serious case of dehydration, cramps or both. Furthermore, to receive the maximum hydration benefit, the driver needs to replace the electrolytes (for example sodium and potassium) lost throughout the race.

Additionally, a race car is traveling at speeds approaching and often exceeding 200 mph. Since the race track is shared by upwards of 30 cars, it is important that the driver keep his hands on the steering wheel and stick shift and his feet on the gas pedal, clutch and brake and that there be a minimal use of his hands or feet for other activities, such as drinking fluids.

Present systems used in race cars, such as in NASCAR races, include water bottles, mounted thermos with flexible tubing used like a straw, or a fluid bag in a pouch with flexible tubing used like a straw, such as a system available from BSR Racing Products. These systems, however, suffer from a number of disadvantages. For example, using a water bottle forces the driver to remove a hand from the controls in order to grasp and drink from the water bottle. Further, such a movement distracts the driver's attention from driving, not only hurting his performance during the race but also threatening his safety and those around him. The other systems provide similar distractions. Because of the distracting nature of these systems, the driver may choose not to drink, resulting in dehydration and poor performance.

In addition, it would be beneficial if the replacement fluid were maintained cold throughout the race. A driver is much more likely to drink more fluid, and stay better hydrated, if the fluid is cold. Additionally, the liquids should be available to the driver any time he or she desires a drink. Because of the inadequate systems in place, more often than not, drivers only drink during caution laps or pit stops.

Furthermore, because the weight of the race car is so strictly regulated and controlled, it is important that the hydration system be as light as possible and not weigh much more than the fluid itself.

There are numerous patents directed to systems, devices and methods for dispensing liquids to humans. Many of these include designs for hands-free operation. Most of these have designs which are specifically directed to a particular application, such as for example, on a bicycle or for running. Very few are directed to use in a car or more specifically are designed to withstand the rigors and demands of auto or truck racing.

The present invention is directed to systems and methods for overcoming these drawbacks and meeting these objections in order to provide a driver of a race vehicle with cool liquids at any time, without compromising his or her driving.

SUMMARY OF THE INVENTION

The present invention is directed to systems and methods for delivering liquid to a driver of a race vehicle.

One embodiment of the present invention is directed to a hydration system having an insulated bag or pouch to be mounted within and preferably on the race vehicle. The insulated bag holds a collapsible bladder or reservoir for holding a liquid. Preferably, at least one cooling item, such as a gel pack, for keeping the liquid cool is located in the insulated pouch and preferably in contact with the collapsible bladder. Tubing is used to couple the collapsible bladder and transfer the liquid to a valve or mouthpiece for the driver to drink from. The fluid is then available to the driver through the valve anytime he desires. The valve can be a bite valve.

Preferably, a pump is coupled to the tubing for ease of circulation of the fluid in and out of the collapsible bladder and to move the liquid from the bladder, through the tubing and to the valve. When the pump is activated, the liquid within the bladder is able to flow from the bladder, through the tubing to the valve and back to the bladder. After activation, the driver can bite down on the bite valve or mouthpiece, and liquid will squirt into his mouth. As a result, the liquid is available to the driver as desired. In addition, the fluid is recirculated through the bladder which is kept cool by the gel pack or other cooling material or medium. As a result, the liquid is kept cool. When the liquid is kept cool, the driver is much more likely to drink the liquid and drink more of the liquid, resulting in less likelihood of dehydration, better performance, and more rapid recovery after a vigorous race.

In a further embodiment, the pump can be activated using a button coupled to the tubing. In a further embodiment, the button is located on a covering around the tubing.

In an alternate embodiment, the pump can be activated using a switch or button which can be mounted in the race vehicle. Preferably, the switch is a rocker switch which lights up when turned on.

In a further embodiment, the tubing has disconnectors located along the tubing for quick disconnect of the tubing In a preferred embodiment, the fluid used in the present invention is an isotonic sports drink.

In a further embodiment, the inside of the insulated bag is made of a tetrafluoroethylene polymer.

Methods using these embodiments are also contemplated in this invention.

The present invention provides a hydration system which requires minimal use of the driver's hands or feet. The present invention also provides a hydration system which allows the driver to drink fluids without taking his or her eyes off the track or road.

The present invention also provides a system wherein the fluids within the system will be maintained cool for the duration of the race.

The present invention also provides a system in which little weight beyond the fluid is added to the race vehicle.

The present invention is not limited to race cars but can also be used, for example, in race trucks.

BRIEF DESCRIPTION OF THE DRAWINGS

FIG. 1 is a cut-away top view of a first embodiment of an in-car hydration system of the present invention.

FIG. 2 is a cut-out view of the tubing and the Y-connector of the embodiment of FIG. 1.

FIG. 3 is a cut-away top view of another embodiment of an in-car hydration system of the present invention.

FIG. 4 is a cut-out view of the tubing and the Y-connector of the embodiment of FIG. 3.

DETAILED DESCRIPTION OF THE PRESENTLY PREFERRED EMBODIMENTS

Figure 5:
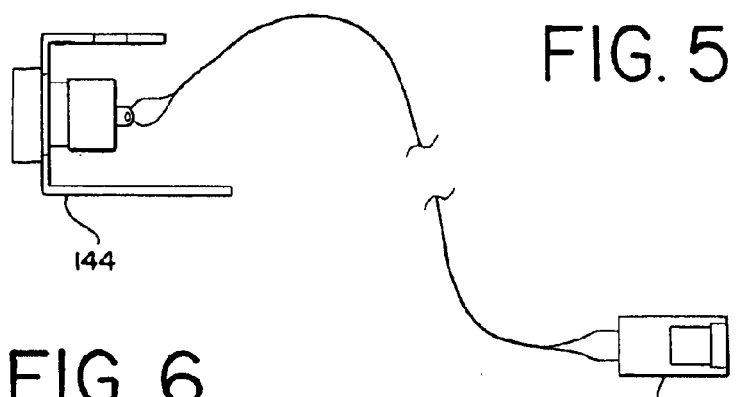
FIG. 5 illustrates a rocker switch that can be used in the present invention.

A first embodiment of the present invention is illustrated in FIG. 1. In the system 10 of this embodiment, a flexible or collapsible bladder or reservoir 12 holds fluid, such as for example an isotonic fluid like GATORADE®, fortified water, or plain water. The bladder 12 is placed in an insulated pouch or bag 14. In one alternative embodiment, the insulated bag can have an inside and outside shell made of a Kevlar fiber, such as for example one called Gentex, with an aluminized Mylar cover. A logo can be placed on the outside shell or cover. Preferably, about 1 inch of EVA foam insulation is located between the inside and outside Kevlar fiber shell. The aluminized Mylar cover reduces accumulation of radiant or conductive heat. In another alternative, while the outside of the shell is made of the Kevlar fiber with the aluminized Mylar cover, the inside of the shell is made of a glass fiber weave polytetrafluoroethylene (PTFE), such as for example Teflon® coating. This coating helps keep the contents of the bag cool for a longer period, is waterproof and prevents fungus from forming. Preferably, between the Kevlar fiber coating and the Teflon coating is about 1 inch of EVA foam insulation. In another alternative, instead of having an insulated bag, just the reservoir may be used. For example, the reservoir itself may be insulated. Alternatively, the bag and reservoir may be combined as one item.

In a preferred embodiment, bladder 12 will hold 100 ounces of fluid. Alternatively, the bladder can be made to hold 4.25 liters, 3 liters or 2.25 liters. The present invention, however, is not limited to such a size, as different sizings can be provided as desired and/or more or less fluid can be in bladder 12 as needed for the race.

Examples of bladders or reservoirs which can be used in the present invention include those made by TFO Inc., MSR, Platypus and Bi-Polar. The bladders can be made of, for example, bi-laminate or tri-laminate material. Additionally, a logo can be placed on the bladder. Preferably, bladder 12 has two openings 16, 18. In a preferred embodiment, a Flexi Flask bladder from TFO Inc. holding 101 ounces of fluid and having two openings is used. The present invention, however, is not limited to the number of openings on the bladder. A dip tube 17 can also be located in one of the openings 18. A dip tube 17 allows the driver to drink almost all of the liquid from the bladder. Without such a tube, it is possible that when drinking, the sides of top portion once emptied could stick together preventing the flow of liquid out of the bladder. Tubing 20 is coupled to the bladder 12 and each opening 16, 18 of the bladder. Tubing 20 can be for example FDA 3A Tygon tubing approved for food industry use, beverage grade. A cap 22, with a connector 24 therein, can be placed on the openings, and the connector 24 connected to the tubing 20. Such caps and connectors typically are available from the manufacturer of the collapsible bladder. A quick disconnector can be used with one or both of the openings for quickly connecting and disconnecting the bladder. Such disconnectors also help reduce line kinking and reduce the total number of components. A standard connect appears to work best with a dip tube. Color coding such connectors or quick disconnectors helps prevent confusion when connecting the bladder.

At the other end of the tubing is a valve or mouthpiece 25 to deliver the fluid to the driver's mouth. Preferably, a bite valve is used. By biting on the valve, fluid will be delivered into the driver's mouth. Many bite valves are available. One example of a possible bite valve that can be used with the present invention is a Camelbak Big Bite Valve.

Preferably, a cooling item, medium or material is located within the insulated bag to keep the fluid cool. In one embodiment, one or more freezer gel packs 26 are located within bag 14 and around bladder 12 to keep the fluid cool. An example of a freezer pack that could be used with the present invention is a U-Tek Refrigerant gel pack +30° from Polyfoam Packers Corporation. Alternatively, a Midlands Polar Pack or other similar type cooling items, which are well known in the art, can be used. In another alternative, a freezer gel component can be part of bladder 12. Bi-Polar sells a bladder with such a design.

Preferably, a pump 28 is used with the present invention to move fluid from bladder 12 to the valve 25. One example of such a pump is a positive displacement gear pump, such as for example a Greylor model PQ-12 DC or a Delrin Miniature Gear pump. The pump is run off a power supply, such as a battery pack 29. One example of a battery pack is a 12 volt battery pack. Such a battery pack can be provided by Rendell sales and other similar manufacturers. Other size battery packs can also be used with the present invention. For example, a 7V, 7A battery pack could be used. Such a battery pack could provide a longer life and may eliminate the need for an on-off switch, which is discussed infra. Alternatively, the pump could be connected to the car, and particularly its electrical system, and powered by the car itself. Other pumps that can be used include a diaphragm pump, a vane pump, a piston pump, a centrifugal pump, and a peristaltic pump. Each type of pump can be of a generally know construction. Preferably, insulation is provided around the pump and battery pack so that heat from them will not heat the fluid. The pump and battery pack could also be placed in a separate pouch or compartment (not shown) within bag 14. Use of the pump is advantageous because it quickly and easily moves the fluid from the bladder to the valve to be available for the driver to drink. This eliminates the need for the driver to have to suck on the valve in order to get fluid which requires a lot of effort and energy from the driver. Also as explained infra, the use of the pump helps keep the fluid cool.

Preferably, at least one piece 30 of tubing is connected between bladder 12 and pump 28. Another piece of tubing 32 is connected between pump 28 and a Y-connector 34 (see FIG. 2). Another piece of tubing 36 is connected between Y-connector 34 and valve 25. For this part of the tubing, a Camelbak Tube Director can be used to provide a partially rigid tubing to ease the driver's use of the device. Alternatively, other partially rigid tubing could be used. Preferably, pump insulation 42 is provided around at least a portion of tubing 36. Yet another piece of tubing 38 is connected between Y-connector 34 and bladder 12. An example of a Y-connector is a 8 mm plastic piece from Cole Palmer. It may be helpful to heat the Y-connector before use so that the two top prongs of the Y can be pushed closer together. This can improve the streamlining of the tubing. Quick disconnectors 40 with shut-offs can also be located on the tubing to disconnect the bladder 12 from the tubing and valve. While optional, the disconnectors make it easier to replace components of the system, such as the bladder, without having to replace the whole system. Again color coding them can reduce confusion when connecting and reconnecting them. Preferably, the tubing 20 is enclosed within insulation 42 such as for example elastomer pipe insulation with thermosleeve. Because of the high temperatures that develop in the car, insulation 42 keeps the liquid cool as it travels through the tubing.

In order to activate the pump, a button or switch 44 can be connected to pump 28. For example, wires 45 can be connected between button 44 and pump 28 and coupled along the tubing 20. In a preferred embodiment, wires 45 and tubing 38 are located within insulation 42, and button 44 is located on insulation 42. The driver can then grab the insulated covered tubing with the button thereon and push button 44 to activate the pump. Once the pump is activated, liquid flows out of bladder 12 through tubing 30 to pump 28. The liquid then flows through tubing 32 to Y-connector 34 and then to tubing 36 and tubing 38 and finally back into bladder 12. When the driver bites down on the bite valve, fluid will be delivered into the driver's mouth. This flow pattern keeps the liquid from sitting in the tubing where it would quickly get warm by exposure for an extended period of time to the heat in the vehicle, without the insulated protection of the bag and gel packs therein. Instead, the (unused) liquid flows back into the bladder where it mixes with the cool liquid therein and stays cool.

In an alternate embodiment, as shown in FIGS. 3 and 4, a switch or button 144 can be located near the driver on the car to operate the pump. Preferably, the switch or button 144 is located where the driver can easily access it, such as with his or her hand or foot. Once the driver hits the button or switch 144, the pump will begin operating and will begin pumping fluid making the fluid available to the driver as described above. This button could be a simple on-off button or switch or a toggle switch. For example, the toggle switch could have three positions, an off position, an on position, and a momentary on position where the driver would hold the switch in this momentary on position only when he wants the pump on.

In a preferred embodiment, the switch 144 can be connected to a rocker switch 145, as shown in FIG. 5. One potential problem with a traditional switch is that it can be accidentally bumped on. The pump will then begin to operate, and because the noise of the car and the race will drown out the sound of the pump operating, the pump will continue to run until the battery runs out. A rocker switch is advantageous as it is very difficult to accidentally switch or bump on. In this embodiment, the driver pushes the rocker switch 145 on when he wishes the pump to begin operating to make fluid available to the driver. The driver pushes the rocker switch off when he is done. A light can also be provided on the rocker switch. The light will go on whenever the switch is on so that the driver will know when the pump is on and running. This will help to alleviate the problem of the pump being on and running, without the driver realizing it because of the noise of the car and race, and running until the battery runs out. An example of such a switch is an APEM K6 series switch.

Figure 6:
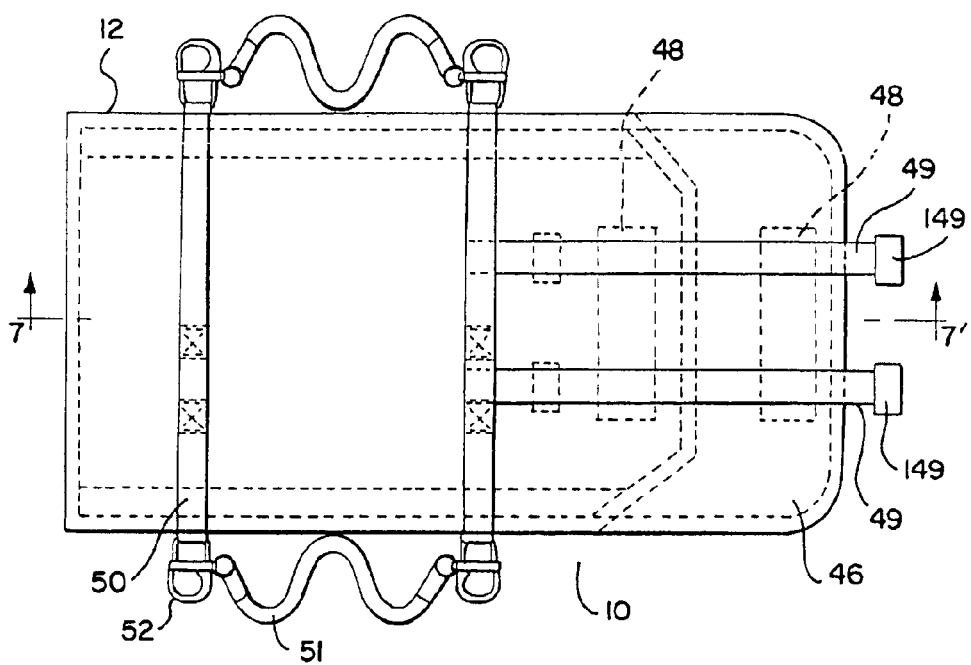
FIG. 6 is a top view of the insulated bag of the present invention.
Figure 7:
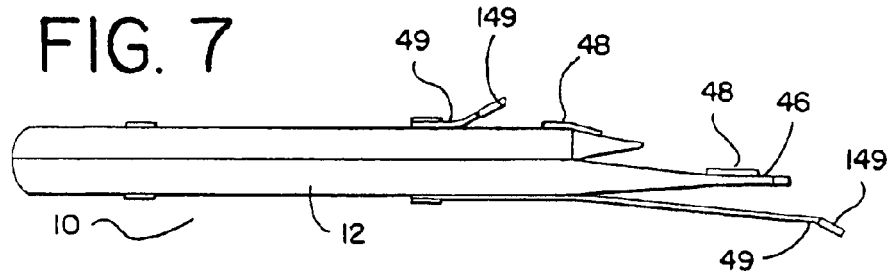
FIG. 7 is a side view of the insulated bag of FIG. 6.

Preferably, bag 14 has a flap 46 to keep bladder 12 in the bag during the race. In order to keep flap 46 closed, a fastening apparatus is used, such as hook and loop strips 48, such as for example VELCRO®, or a buckle 149 and strap 49, or both. FIGS. 6 and 7 show another view of flap 46 and fastening apparatus 48 and 49. An example of such a buckle is a quick lock buckle. Alternatively, a zipper or other fastening apparatus could be used.

Bag 14 also preferably has straps 50 with hooks 52 which can be used to fasten bag 14 to, for example, a roll bar in the race vehicle. For example, load rated containment straps 51 can be used. In a preferred embodiment, bag 14, with bladder 12, can be mounted or hung from the roll bar of a race vehicle. For example, hooks can be attached to the roll bar, by welding or bolts. The hooks 52 on bag 14 can be attached to the hooks on the roll bar. So as to not obstruct the driver's vision, the bag can be hung securely on the right side of the driver's cockpit.

Instead of a bite valve, the present invention also contemplates that an arrangement can be provided to allow the driver to access the fluid by sucking or sipping. For example, a tip can be placed on the end of the flexible tubing on which the driver could suck or sip the fluid.

The liquid in the bladder can be an isotonic beverage, such as for example GATORADE®. However, other size beverage containers and other types of beverages, including water and fortified water, are also within the scope of the present invention.

Figure 8:
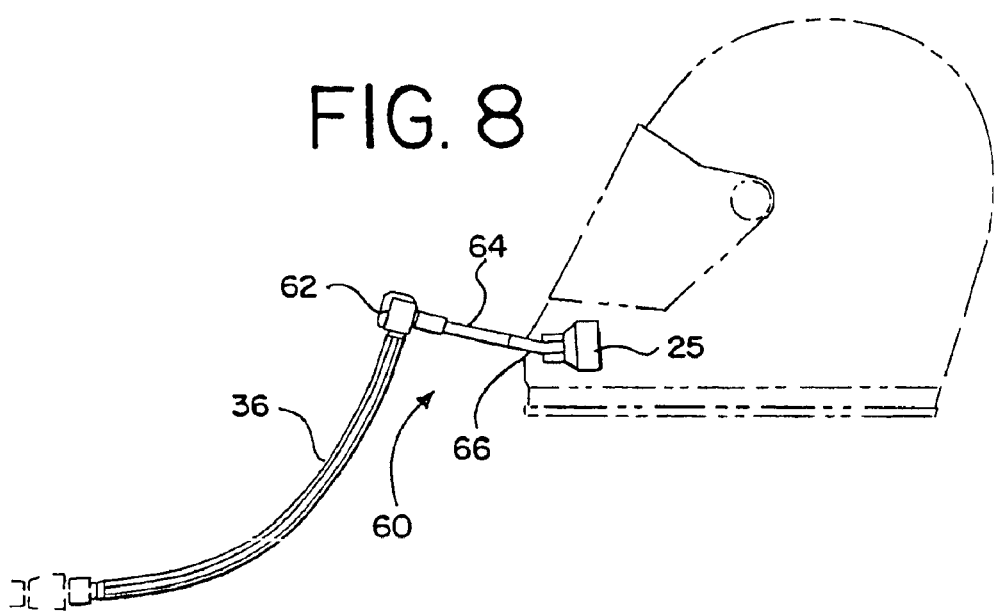
FIG. 8 illustrates a portion of an embodiment of the present invention wherein the tubing and valve are located in driver's helmet.

In any of the embodiments of the present invention, the tubing and valve can be fed to the driver's mouth in a number of different ways. For example, a hole can be drilled through the driver's helmet. The flexible tubing is inserted through the hole and on the inside of the helmet, attached to the valve as shown in FIG. 3 at 60. FIG. 8 shows an enlarged view of a possible connection through the helmet. In one possible example of this embodiment, as illustrated in FIG. 8, tubing 36 is connected to a solid or partially rigid piece of tubing 62 that is bent at an angle, such as for example the approximate 90° angle shown in the figure. An example of such a tubing is a Camelbak 90° Hydrolock. Tubing 62 is preferably coupled to one or more pieces of dental tubing 64, 66. Examples of such dental tubing include Pearson dental tubing no. X26-05-09, X26-05-11, or X26-05-06. A bite valve 25, such as that discussed supra or Camelbak thermal control pak can be used at the end of the tubing 66. Preferably, the valve should be in close proximity to the driver's mouth but not continuously in the mouth. Alternatively, the flexible tubing can be inserted through the visor area of the helmet or under the helmet and up by the chin. In any case, the valve would be placed in close proximity to the driver's mouth.

In order to keep the flexible tubing from getting in the driver's way, in another embodiment, the tubing or insulation covering it can be attached to the driver's suit or to the restraint structures within the vehicle. Preferably, the tubing would be attached with a hook and loop material, such as VELCRO®, and/or other quick disconnect devices, so that the driver can become quickly disconnected from the tubing if it is necessary for him to quickly leave the car. Such attachment material also makes it easy for the driver to locate and re-attach the tubing when he wishes to take a drink and to replace the tubing after drinking.

It will be understood that the embodiments and examples of the present invention, which have been described, are illustrative of some of the applications of the principles of the present invention. Numerous modifications may be made by those skilled in the art without departing from the true spirit and scope of the invention.

What is claimed is:

1. A hydration system for a driver of a vehicle comprising:
   a collapsible bladder for holding a liquid;
   at least one gel pack for keeping said liquid cool;
   an insulated bag for holding said bladder and said gel pack, said insulated bag having a tetrafluoroethylene polymer interior lining;
   tubing having two ends with one end coupled to said collapsible bladder;
   a valve connected to the other end of said tubing; and
   a pump coupled to said tubing to move liquid between said bladder and said valve,
   wherein said bag is mounted onto said vehicle, and
   wherein said liquid flows out of said collapsible bladder through said tubing to said valve when the driver activates said pump.

2. The system of claim 1 wherein said collapsible bladder has first and second openings and tubing is coupled to both openings,
   whereby when said driver activates said pump, said liquid flows 9out of said first opening in said bladder, through one piece of said tubing to said valve and unused fluid flows from said valve through a second piece of tubing to said second opening in said bladder and back into said bladder.

3. The system of claim 2 further comprising a Y-connector connected to said one piece of tubing and said second piece of tubing and to a third piece of tubing connecting said Y-connector and said valve.

4. The system of claim 1 wherein said tubing is inserted through a hole in the driver's helmet and said valve is located within the helmet and in close proximity to the drivers's mouth.

5. The system of claim 4 wherein said tubing inserted through the hole in the driver's helmet is dental tubing.

6. The system of claim 1 wherein said tubing is inserted through the visor area of the driver's helmet and said valve is located within the helmet and in close proximity to the driver's mouth.

7. The system of claim 1 wherein said tubing is inserted under the driver's helmet and said valve is located within the helmet and in close proximity to the driver's mouth.

8. The system of claim 1 further including a rocker switch for turning said pump on and off.

9. The system of claim 8 wherein said rocker switch has a light that is on when said pump is switched on.

10. The system of claim 1 wherein said valve is a bite valve.

11. The system of claim 1 wherein said bag is mounted to a roll bar in the vehicle.

12. The system of claim 11 wherein straps are attached to said bag and connect around said roll bar to hold said bag on said roll bar.

13. The system of claim 1 wherein said bag includes a flap to close said bag and keep said bladder securely in said bag.

14. The system of claim 13 wherein said flap is held closed by a fastening apparatus elected from the group consisting of hook and loop material, straps and zippers.

15. The system of claim 1 wherein said liquid is an isotonic sports drink.

16. The system of claim 1 wherein said bag has an outside layer of Kevlar fiber and aluminized Mylar with insulation between the interior lining and outside layers.

17. The system of claim 1 further including at least one quick disconnector on said tubing, and a dip tube in said collapsible bladder, said dip tube being coupled to said tubing.

* * * * *

UNITED STATES PATENT AND TRADEMARK OFFICE
CERTIFICATE OF CORRECTION

PATENT NO. : 6,851,275 B2  Page 1 of 1
APPLICATION NO. : 10/641722
DATED : February 8, 2005
INVENTOR(S) : Kurt Kreutzmann et al.

It is certified that error appears in the above-identified patent and that said Letters Patent is hereby corrected as shown below:

In the Specification:

Col. 4 line 48 delete "know" insert -- known --.

Col. 5 line 3 delete "a" insert -- an --.

Col. 5 line 18 delete "wires" insert -- wire --.

Col. 5 line 20 delete "wires" insert -- wire --.

Signed and Sealed this

Fifth Day of September, 2006

JON W. DUDAS
*Director of the United States Patent and Trademark Office*